United States Patent [19]
Westell

[11] Patent Number: 4,782,228
[45] Date of Patent: Nov. 1, 1988

[54] HIGH EFFICIENCY OPTICAL SCANNER WITH MULTIPLEXING MEANS

[75] Inventor: William E. Westell, Weston, Mass.
[73] Assignee: Honeywell Inc., Minneapolis, Minn.
[21] Appl. No.: 3,997
[22] Filed: Jan. 16, 1987
[51] Int. Cl.[4] .......................... H01J 3/14; G02B 26/08
[52] U.S. Cl. ..................................... 250/236; 250/347; 350/6.8
[58] Field of Search ............... 250/236, 235, 234, 341, 250/342, 347; 350/6.8, 6.7, 6.5, 6.1, 274; 358/199, 204, 206, 226

[56] References Cited
U.S. PATENT DOCUMENTS

| | | | |
|---|---|---|---|
| 4,124,269 | 11/1978 | Beckmann | 350/6.8 |
| 4,243,294 | 1/1981 | Noguchi | 350/6.8 |
| 4,458,982 | 7/1984 | Blain et al. | 250/236 |
| 4,537,465 | 8/1985 | Sherman et al. | 350/274 |
| 4,574,197 | 3/1986 | Kliever | 350/6.8 |
| 4,613,877 | 9/1986 | Spencer et al. | 350/6.8 |

FOREIGN PATENT DOCUMENTS 0238811  11/1985  Japan .................................. 250/236

*Primary Examiner*—David C. Nelms
*Assistant Examiner*—Michael Messinger

[57] ABSTRACT

An improved optical system having an opto-mechanical scanner for increasing the duty cycle of the scanner while maintaining a constant optical aperture throughout the scan. Two alternating optical paths are provided between the scanner and a transducer by use of an optical multiplexer synchronized with the scanner rotation.

16 Claims, 3 Drawing Sheets

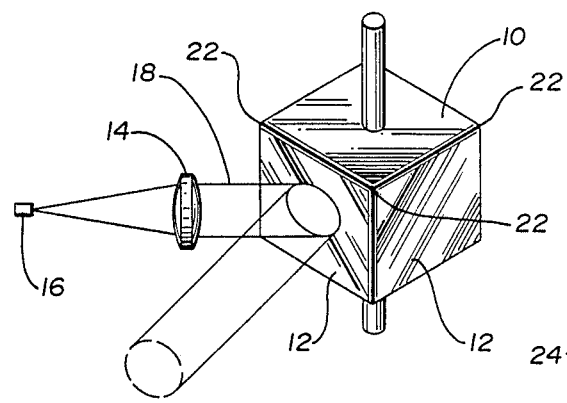
Fig. 1 PRIOR ART
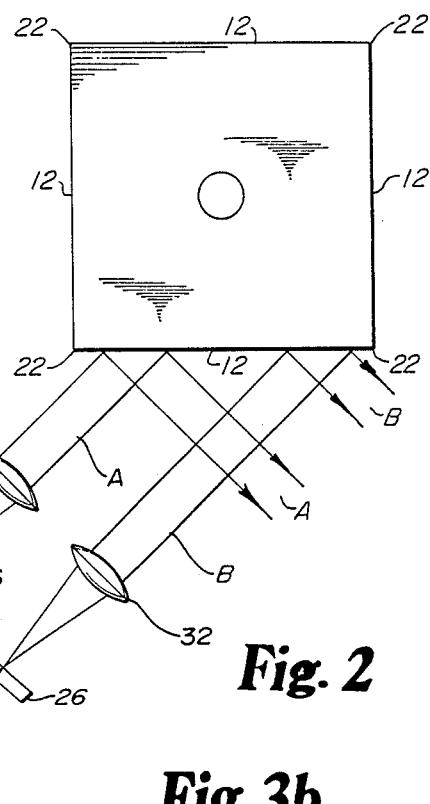
Fig. 2
Fig. 3b
Fig. 3a
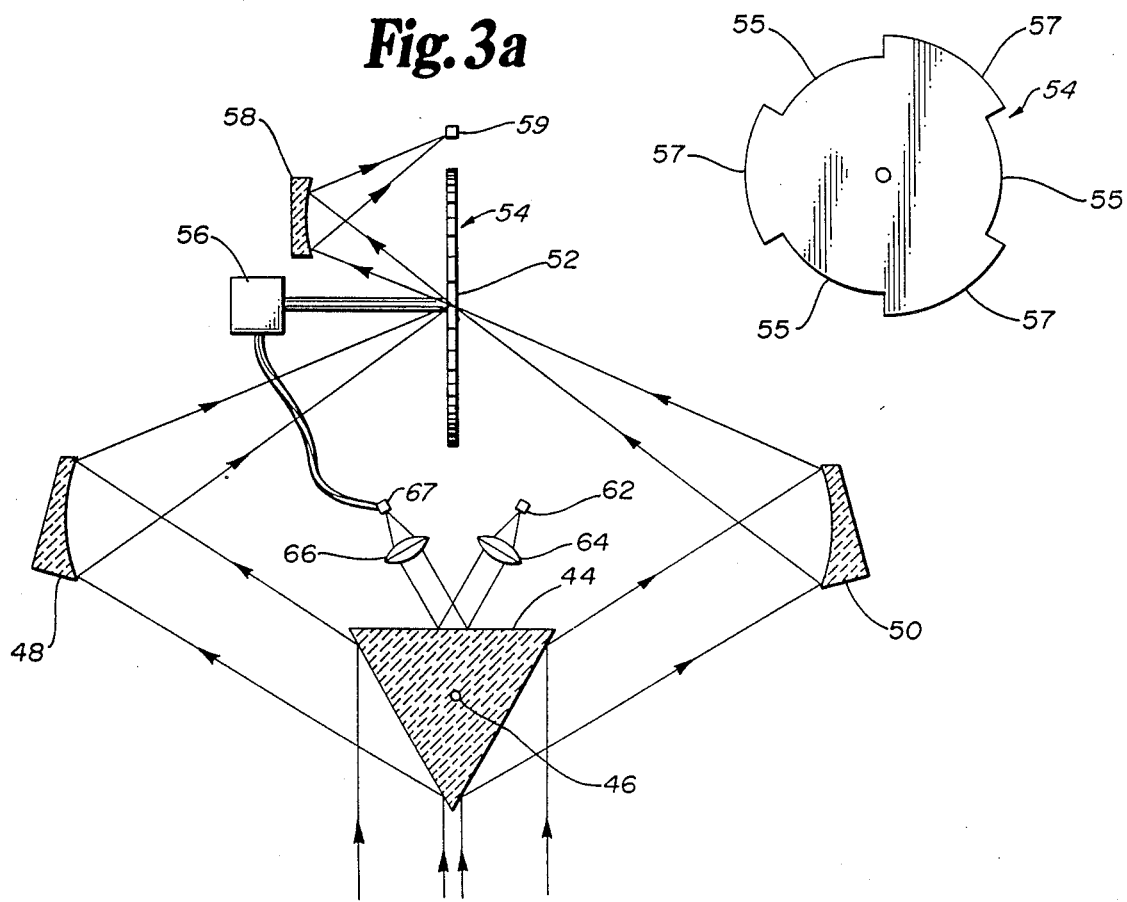

HIGH EFFICIENCY OPTICAL SCANNER WITH MULTIPLEXING MEANS

This invention relates to electro-optical systems employing opto-mechanical scanners and, more particularly, to a novel optical technique for use with opto-mechanical scanners in order to increase the duty cycle of such scanners.

Opto-mechanical scanning systems are used in high performance applications to scan an optical collimated beam either to view a scene or illuminate a photo-sensitive material. Typical applications include infrared (IR) line scanners, forward looking infrared scanners (FLIRS), and laser printers. In one widely used type of opto-mechanical scanner, reflecting facets of a rotating polygon move through a collimated beam of light or IR energy. FIG. 1 of the drawings show a simplified schematic drawing of this type of scanning system. The teachings of this invention readily apply to this type of scanner.

As will be appreciated by those skilled in the art, practical optical and mechanical limitations restrict the size of a scanning element relative to the size of the collimated energy beam. Since the system can effectively scan the beam only so long as the beam lies wholly on the scanning surface, as the boundary between adjacent reflective surface moves through the collimated beam, there is a portion of the scanning cycle during which the beam is being retraced. Typical systems have a relatively low scanning duty cycle, in a range of 50 to 80 percent.

In certain infrared information gathering applications, such as IR line scanners in low flying reconnaissance aircraft, it is desirable to provide practically 180 degree horizon-to-horizon coverage. However, with a need to block all energy from one horizon before scanning the other horizon, and a need to use scanning elements of a reasonable size, the scanning coverage in these systems is limited to less than 180 degrees because retrace between horizons occupies the entire interval in which the collimated beam passes through a boundary between adjacent facets of the scanning elements.

A laser printer is another device which employs a mechanical scanner and in which it is highly desirable to have the duty cycle as close to 100% as practical in order to maximize throughput and minimize or eliminate the need for buffer storage.

An object of this invention is the provision of an improved optical system for use with electro-mechanical scanners to increase the duty cycle of the scanner while maintaining a constant optical aperture throughout the scan.

Briefly, this invention contemplates the provision of an optical system in which there are two optical paths between the scanner and an electro-optic transducer. A high speed optical multiplexer switches between the two paths synchronously with the scanner rotation so that a beam from one path is always completely convolved with the surface of a scanning element.

The invention is described in greater detail with reference to the following drawings, in which:

FIG. 1 is a simplified schematic diagram of a scanner of a type commonly used in the prior art and to which the teachings of this invention apply;

FIG. 2 is a simplified schematic diagram of a scanning system constructed in accordance with the teachings of the present invention;

FIG. 3a is an optical diagram of a specific embodiment of an infrared line scanner in accordance with the teachings of this invention;

FIG. 3b is a plan view of a mechanical optical multiplexer used in the embodiment of FIG. 3a;

FIG. 3c is a perspective view of the optical embodiment of FIG. 3a;

FIG. 4b is a schematic diagram of the multiplexer in FIG. 4a;

FIG. 5 is a diagram of a multiplexer which may be used in the embodiments of FIG. 3a and FIG. 4a; and FIGS. 6a and 6b are an optical diagram of an infrared line scanner which may be used in place of the embodiment of FIG. 3a and other applications which may use the embodiment of FIG. 3a.

Figure 3C:
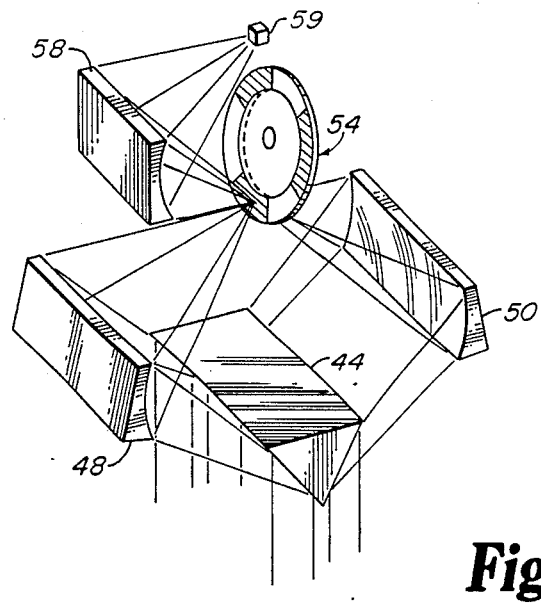

Referring now to FIG. 1 of the drawings, a scanner widely used in the prior art comprises a constantly rotating polygon 10 with four reflective surfaces 12 and edges or boundaries 22. An objective lens 14 forms an optical path between an electro-optical transducer 16 and the optical deflector or scanner 10. The lens 14 forms a collimated beam 18 of optical energy through which the reflective faces 12 of the scanner move. The lens 14 also focuses the beam on transducer 16 which has an effective aperture that is small relative to the size of the collimated beam. It will be appreciated that the transducers may be either a source or sensor of the radiant energy beam 18.

In practical scanning systems, the size of the beam necessarily covers a substantial portion of the face of a scanning element; e.g., in the order of between 20% and sometimes as much as 50 percent. The time it takes a boundary 22 between two successive scanning elements 12 to pass through the beam 18 determines the retrace interval of the scan. The duty cycle of the scanner is the ratio of the time the beam is completely convolved on the scanning faces during one revolution of the total time for one complete revolution of the scanner.

Referring now to FIG. 2, it shows the present invention in the context of a constantly rotating square scanning element 10 and a transducer 16, the same as those illustrated in FIG. 1. In accordance with the teachings of this invention, there are two optical paths labeled A and B between the scanning element and the transducer. One optical path includes an objective lens 24, an optical multiplexer 26, and a elliptical focusing mirror 28. The other path is similar. It includes an objective lens 32, the same multiplexer 26 and a elliptical mirror 34.

The optical multiplexer 26 is a high speed optical switch that alternatively blocks radiant energy along one path and transmits it along the other and directs the image of the electro-optical transducer element 16 alternatively to one of the two objective lenses 24 and 32. The multiplexer 26 switching is synchronized with the rotation of the scanner 10. The lenses 24 and 32 focus the beams at the multiplexer. With the energy of the beams thus concentrated, they can be rapidly switched by a mechanical chopper 26 rotating synchronously with the scanner 10, thus providing a high duty cycle by reducing the retrace time to the time required for each edge of the chopper to traverse the concentrated beam at the image of transducer 16 on chopper 26.

In this embodiment, collimating lenses 24 and 32 preferably are displaced from one another in the scanning direction by nominally one-half of the length between boundaries 22 of the scanning element 12. The multiplexer switches beam paths when the boundaries 22 pass through beams A and B. The beam which is completely convolved with face 12 of scanner 10 is selected by multiplexer 26.

A mechanical chopper edge rotating synchronously with the scanner 10 can cross the focused transducer image in less than 1 percent of the total scan period, providing a duty cycle on the order of 99 percent, since one beam path will always be totally convolved on a scanning face.

In the preferred embodiment of the invention, a mechanical chopper is used. However, it will be appreciated that any suitable fast acting multiplexer can be used in the practice of the invention. The mechanical chopper and scanner are preferably arrayed in sectors on rotating members whose rotation can be synchronized by various techniques known in the art. For example, the rotating members can be mechanically geared to one another, either directly or by a differential gear if variable phasing is desired as in an IR scanner to compensate for aircraft roll. The rotating member carrying the optical multiplexer elements can be controlled by a phase-lock-loop with optical pickups on the scanning member, preferably provided by the scanning elements themselves for accuracy. The optical multiplexer elements and the scanning elements can also be arrayed on the same rotating member in concentric rings, with the optical path between elements folded back with the prisms, mirrors or other suitable optical relay elements.

FIGS. 3a and 3c show an infrared scanner which uses a three-sided mirror 44 to scan 180° between horizons left and right. The optical multiplexer or scanner 44 is an equilateral triangle and it rotates at a constant angular velocity about its axis 46. A pair of elliptical mirrors 48 and 50 are disposed to project respectively a beam along two optical paths, one from the left side and one from the right side of the rotating mirror, to a common primary focal plane 52.

An optical multiplexer 54, shown in plan in FIG. 3b, comprises a thin disk with alternating reflective and transmissive sectors 57 and 55, respectively, around its periphery. The reflective and transmissive paths pass through the common focal plane 52. The disk is driven by a servo motor 56 whose rotational speed is phase-locked to the rotational speed of the scanning mirror 44. An elliptical relay mirror 58, common to both beam paths, refocuses the beam on an IR detector or detector array 59.

Switching between beam paths occurs when a boundary between the reflective and transmissive sectors of the optical multiplexer pass through the image of the detector 59 focused on the multiplexer. Since the detector image is very small at this point and the beam energy is concentrated, switching can occur in less than 1 percent of the time required for a 180 degree scan. The multiplexer rotation is synchronized with the scanner rotation so that switching occurs every 90 degrees, at the horizons and at the nadir.

A light emitting diode 62, a lens 64, lens 66 and a detector 67 optically sense the scanning mirror position and provide a series of reference pulses to the controlling servo motor 56 in a phase-lock loop. Electronic control of the optical multiplexer permits adjustment of the phase of the switching to compensate for motion of the scanning system itself. Thus, signals from an autopilot or an inertial navigation system can be used to compensate for roll of an aircraft carrying the infrared imaging system. Similarly, a differential gear between the shafts of the optical multiplexer and the scanning mirror could be used to provide mechanical phase adjustment of the switching.

In the specific embodiment shown in FIG. 3a, reflective lenses are used to provide wide band infrared operation. Alternatively the required optical configuration could be achieved with refractive elements and mirrors.

Figure 4B:
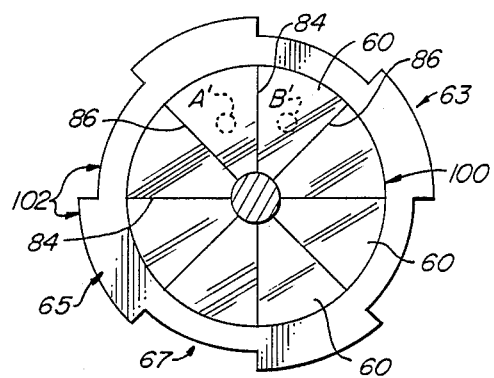
Figure 4A:
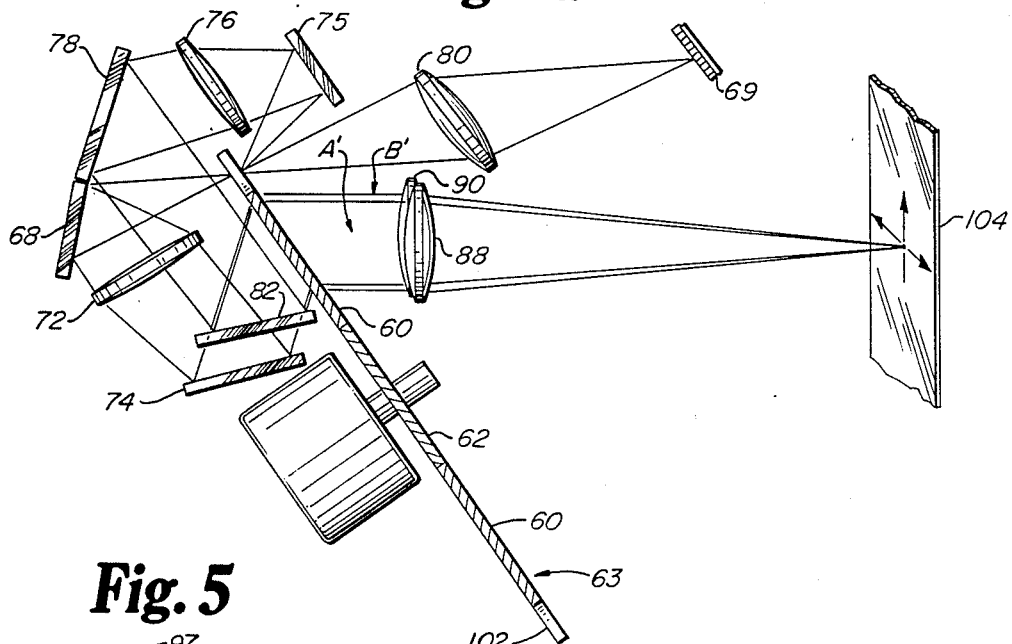
FIG. 4a is an optical diagram of an embodiment of the invention in the context of a laser printer.

FIGS. 4a and 4b show the principals of the invention applied to a laser printer. In operation a laser printer exposes a moving photo sensitive film or drum with line scans of the image of a point source of optical energy, such as an electronically-controlled laser diode modulated to produce a desired image. The scanning is typically bi-directional and can be accomplished with reflective or holographic optical elements arranged on a scanning disk. For a given disk velocity, the effective scan rate can be multiplied by the use of a number of scanning elements rather than a single element in the image plane. This provides a high writing rate with a modest shaft speed. In accordance with the teachings of this invention, there are two optical paths between the image generating laser and the scanning system. A high speed multiplexer switches the path to provide a scanner with a high duty cycle.

In this embodiment of the invention, the scanner comprises a series of holographic segments 60 on a disk 63 which rotates at a constant angular velocity. The holographic scanning segments 60 fill an inner annular ring 100 on the disk 63. An outer ring 102 has alternately transmissive and reflective sectors 67 and 65, respectively, forming an optical multiplexer.

The beam paths between a laser diode array 69 and the scanning segments 60 include a relay lens 80 which focuses an image of the diode array at the outer ring 102 comprised of alternating transmissive sectors 67 and reflective sectors 65. The relay lens 80 is common to both paths. The transmissive path through the multiplexer includes a folding mirror 68, a collimating lens 72, and another folding mirror 74 which directs the collimated beam onto the holographic scanner segments 60.

The reflective path includes, in addition to relay lens 80, a folding mirror 75, a collimating lens 76 and a pair of folding mirrors 78 and 82 which direct the collimated beam to the holographic scanner segments 60.

The positioning of the mirrors and collimating lenses 72 and 74 form the beam paths A' and B' at a common radial and different tangential locations on the holographic scanning segments 60. As shown most clearly in FIG. 4b, the beams A' and B' framed by the two paths, are displaced in a direction tangent to disk 63 by one-half the period of a holographic scanning sector measured along the same tangent between the sectors bounding edges 84 and 86. As is also most clearly shown in FIG. 4b, there is one transmissive sector 67 and one reflective sector 65 per holographic sector pair. The optical chopper thus switches the beam paths when they are equidistant from the centers and the edges of the holographic elements.

A pair of lenses 88 and 90 focus the beams in path A' and path B', respectively, on to moving photo sensitive film 104.

The beam paths A' and B' can be differentially displaced radially in addition to or instead of tangentially and the holographic sectors can lie on concentric rings if differential tangential spacing is desired.

Figure 5:
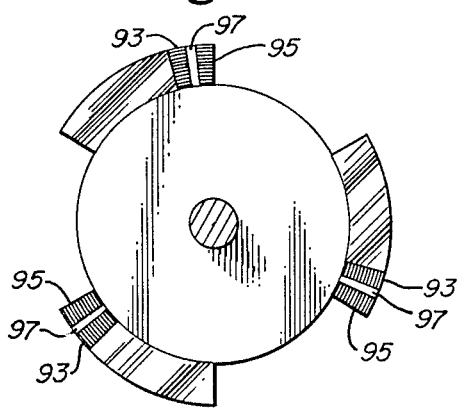

Referring now to FIG. 5, as will be appreciated by those skilled in the art, in an infrared scanning system such as that shown in FIG. 3a, it is desirable to provide a fast horizon-to-horizon retrace without superposition of horizons, a warm reference for calibration, and a cold spike reference. These can conveniently be provided by placing black body stripes 93 and 95 on a portion of the reflective sector of the optical chopper separated by a cold spike retroflective mirror 97. The first black body stripe 93 and the second black body stripe 95 provide a warm reference isolated from horizon radiation. Mirror strip 97 provides a cold spike.

Figures 6A, 6B:
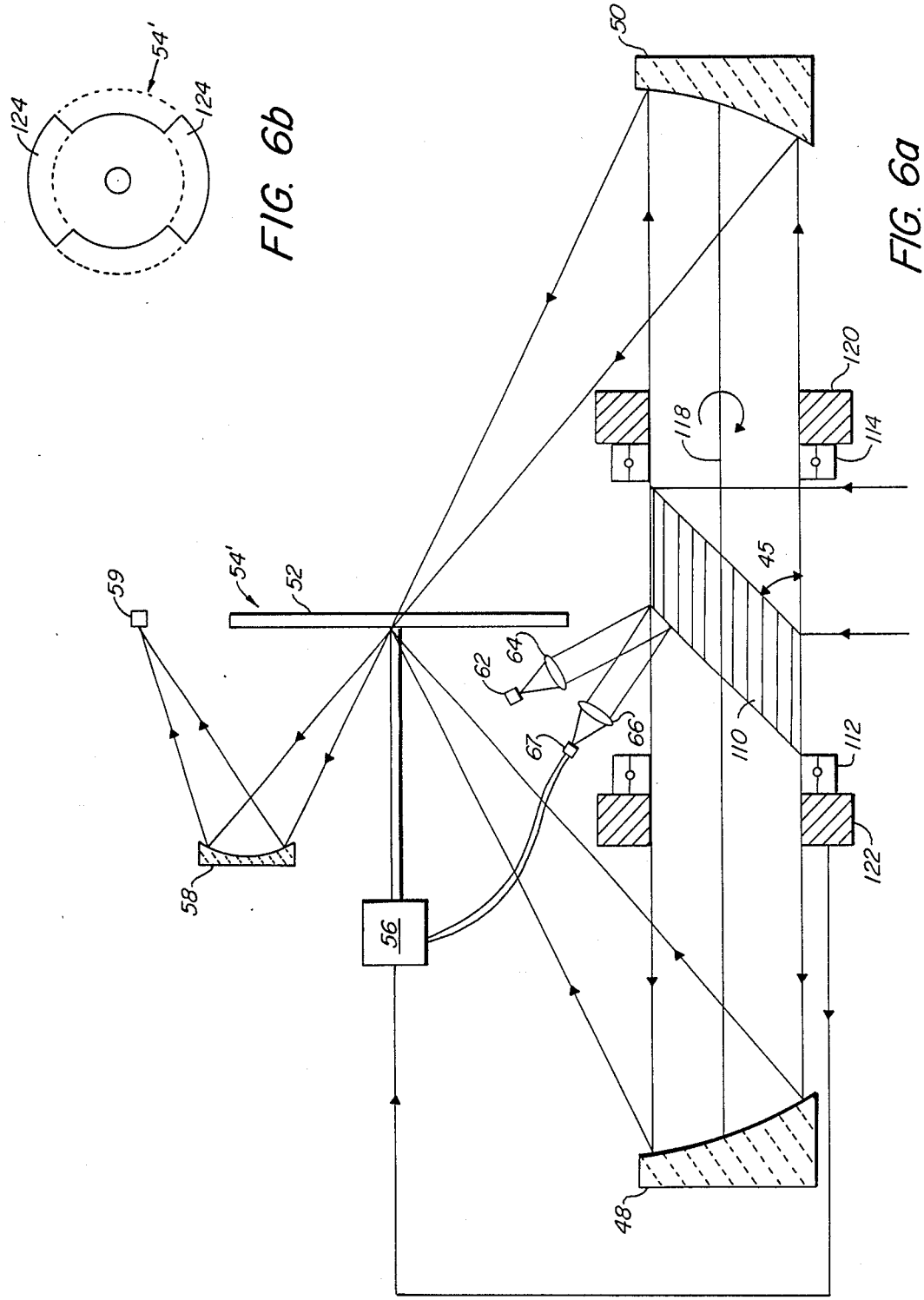

Now referring to FIGS. 6a and 6b, elements similar to or the same as those of the embodiment of FIG. 3a are, for ease of explanation, marked with the same element numbers. The embodiment of FIGS. 6a and 6b provides an improvement in the scanning efficiency over that the prior art as well as the embodiment of FIG. 3a. Essentially, the three-sided scanner 44 is replaced with a flat, circular scanning mirror 110 which is held by bearings 112 and 114. The scanning mirror 110 rotates about axis of rotation 118 through centers of mirror 110 are and elliptical mirrors 48 and 50. The surfaces of mirror 110 are parallel to each other and their planes are inclined about 45 degrees from the axis of rotation. The hollow-shaft drive motor 120 drives the scanning mirror 110. The hollow-shaft components include the drive motor 120, reference encoder 122 (coupled to synchronize motor 56) and bearings 112, so as to allow a circular bundle of rays reflected off mirror 110 to pass to elliptical mirrors 48 and 50 without loss.

The optical chopper blades 124 (as shown in FIG. 6b) switch the rays received by optical multiplexer 54' from mirror 48 to those from mirror 50, and vice versa, when mirror 110 reaches a position ninety degrees from the position shown in FIG. 6a. The switching time is extremely fast due to the very small size of the detector-array image at the optical multiplexer's plane 52. Switching times in the order of 0.4 percent of the scanning period are easily obtained in typical applications, thus providing typical scanning efficiencies of 99.6 percent.

It should be understood that variations may be made to the above-disclosed embodiments without departing from the spirit and scope of the present invention. For example, the number of surfaces of the scanner is not limited to the number of or pairs of transmissive and/or reflective segments of the multiplexer. Also, the scanner and/or multiplexer need not necessarily be rotated, but may in fact be moved, such as, for example, by linear translation or a combination thereof. In addition, the 45 degree angle of scanner 110 may be changed to some other angle depending upon the application. It should also be uderstood that more than two beam paths may be utilized without departing from the spirit and scope of the invention.

Having described the invention, what is claimed as new and novel and for which it is desired to secure Letters Patent is:

1. An optical system for scanning a collimated beam of radiation comprising in combination:
    moving means;
    transducer means;
    an optical deflection means having a plurality of scanning surfaces, each said surface delineated by boundaries separating said surface from adjacent surfaces, and optical scanning means coupled for movement in said beam by said moving means to form first and second optical paths for radiation between said surfaces and said transducer means;
    means in said first optical path for directing radiation in said first beam to a first focus position and from the first focus position directing radiation to said transducer means;
    means in said second optical path for directing radiation in said second beam to the first focus position and from the first focus position directing radiation to said transducer means; and
    an optical multiplexer mounted at the first focus position, said multiplexer operating synchronously with the motion of said deflection means to alternatively block radiation in said first path and allow transmission along said second path so as to maximize the duty cycle of the optical system.

2. A system as claim 1 wherein said deflection means is formed with three scanning surfaces.

3. A system as in claim 1 wherein said deflection means is substantially flat and includes two said surfaces, and wherein said deflection means is inclined from its axis of rotation by a predetermined angle.

4. A system as in claim 3 wherein said angle is substantially forty-five degrees.

5. A system as in claim 3 wherein said deflection means is substantially circular in cross section.

6. A system as in claim 5 wherein said angle is substantially forty-five degrees.

7. A system as in claim 1 wherein said multiplexer includes transmissive segments and non-transmissive segments in order to alternatively block said first and said second paths.

8. A system as in claim 7 wherein said non-transmissive segments are reflective.

9. A system as in claim 7 wherein said transmissive segments include warm and cold reference subsegments for readily enabling the calibration of said system in an infrared scanning system environment.

10. A system as in claim 1 wherein said optical deflection means includes a plurality of holographic elements for enabling a scanning function.

11. A system as in claim 10 wherein said optical deflection means and said optical multiplexer are mechanically coupled together for motion.

12. A system as in claim 1 wherein said optical deflection means and said optical multiplexer are coupled for movement by rotation.

13. A system as in claim 1 wherein said deflection means includes four scanning surfaces.

14. An optical system for scanning a collimated beam comprising in combination:
    a rotating optical deflection means having a plurality of scanning surfaces, each surface delineated by boundaries separating said surface from adjacent surfaces;
    an electro-optical transducer means;
    a first optical path between said transducer means and said deflection means;
    means in said first optical path for forming a first collimated beam at a first location on said deflection means and focusing said first collimated beam at said transducer means and at a focal point intermediate to said deflection means and said transducer means;
    a second optical path between said transducer means and said deflection means;
    means in said second optical path forming a second collimated beam at a second location on said deflection means spaced from said first location at a distance substantially equal to half the distance between said boundaries and focusing said second collimated beam at said transducer means and at said intermediate focal point; and an optical multiplexer located at said intermediate focal point to maximize the duty cycle of the system, said optical multiplexer comprised of alternatively transmissive and reflective segments passing through said focal point synchronously with the rotation of said deflection means to alternatively block one of said paths and transmit along the other path so that a beam from said other path is always fully convolved with a surface of said deflection means.

15. An optical scanning system comprising:

a two-sided reflector mounted at an angle with respect to a first axis;

motive means for rotating the reflector about the first axis, radiation from the field of view being reflected from one side of the reflector along a first path and radiation from the field of view being reflected from the other side of the reflector along a second path;

first means mounted to receive radiation in the first path and to focus the radiation proximate a first potition;

second means mounted to receive radiation in the second path and to focus the radiation proximate the first position;

multiplexing means mounted proximate the first position to alternatively block and transmit radiation from the first and second paths, respectively; and third means mounted to receive radiation from the multiplexing means and transmit such radiation to the radiation detector.

16. An optical system for scanning a collimated beam comprising in combination:

a rotating optical deflection means having a plurality of scanning surfaces, each surface delineated by boundaries separating said surface from adjacent surfaces;

an electro-optical transducer means;

a first optical path between said transducer means and said deflection means;

means in said first optical path for forming a first collimated beam on said deflection means and focusing said first collimated beam at said transducer means and at a point intermediate to said deflection means and said transducer means;

a second optical path between said transducer means and said deflection means;

means in said second optical path for forming a second collimated beam on said deflection means and focusing said second collimated beam at said transducer means and at a point intermediate to said deflection means and said transducer means; and an optical multiplexer at the intermediate focal point of said first and second paths, said multiplexer operating synchronously with the rotation of said deflection means to alternatively block one sad path and transmit along the other said path so that beam from the other said path is always fully convolved with a surface of said deflection means and the duty cycle of the system approaches 100%.

* * * * *

UNITED STATES PATENT AND TRADEMARK OFFICE
CERTIFICATE OF CORRECTION

PATENT NO. : 4,782,228

DATED : November 1, 1988

INVENTOR(S) : William E. Westell

It is certified that error appears in the above-identified patent and that said Letters Patent is hereby corrected as shown below:

Column 5, line 65, delete "and" and insert --said--.

Column 6, line 15, after "as", insert --in--.

Signed and Sealed this

Fourth Day of April, 1989

*Attest:*

DONALD J. QUIGG

*Attesting Officer*    *Commissioner of Patents and Trademarks*